(12) United States Patent
Knauer et al.

(10) Patent No.: US 11,028,217 B1
(45) Date of Patent: Jun. 8, 2021

(54) THERMOPLASTIC POLYURETHANE COMPOSITIONS COMPRISING NITRO-SUBSTITUTED POLYESTER DIOLS

(71) Applicant: BioCellection Inc., Menlo Park, CA (US)

(72) Inventors: Katrina Marie Knauer, Redwood City, CA (US); Jennifer Le Roy, Sunnyvale, CA (US); Cody James Higginson, Fremont, CA (US); Russell Clayton Pratt, San Mateo, CA (US); David Samuel Pilsk, San Jose, CA (US)

(73) Assignee: BioCellection Inc., Menlo Park, CA (US)

( * ) Notice: Subject to any disclaimer, the term of this patent is extended or adjusted under 35 U.S.C. 154(b) by 0 days.

(21) Appl. No.: 16/985,009

(22) Filed: Aug. 4, 2020

Related U.S. Application Data

(60) Provisional application No. 62/989,098, filed on Mar. 13, 2020.

(51) Int. Cl.
    *C08G 18/46*       (2006.01)
    *C08G 18/76*       (2006.01)
    (Continued)

(52) U.S. Cl.
    CPC ....... *C08G 18/463* (2013.01); *C08G 18/4244* (2013.01); *C08G 18/757* (2013.01);
    (Continued)

(58) Field of Classification Search
    CPC .............. C08G 18/463; C08G 18/4244; C08G 18/757; C08G 18/7621; C08G 18/7671;
    (Continued)

(56) References Cited

U.S. PATENT DOCUMENTS 3,245,962 A    4/1966  Fischer
3,475,383 A *  10/1969 Stewart ................ C08G 18/384
                                                        528/80

(Continued)

FOREIGN PATENT DOCUMENTS

CA    1074494 A    3/1980
EP    0292405 A1   11/1988
(Continued)

OTHER PUBLICATIONS

Gantrade, FAQ/Polyurethane curatives and chain extenders, 2010_ p. 1-14. https://www.gantrade.com/faq/polyurethane-curatives-chain-extenders.*

(Continued)

*Primary Examiner* — Michael L Leonard
(74) *Attorney, Agent, or Firm* — Sterne, Kessler, Goldstein & Fox P.L.L.C.

(57) ABSTRACT

This invention relates to the field of polymers. More specifically, the invention comprises thermoplastic polyurethane elastomers comprising polyesters comprising nitro-substituted dicarboxylic acids that are products obtained by decomposition of polyethylene. The thermoplastic polyurethane elastomers described herein exhibit higher glass transition temperatures and higher Shore A hardness compared to thermoplastic polyurethane elastomers synthesized from similar polyester diols made from virgin monomers that do not contain nitro substitution.

28 Claims, 1 Drawing Sheet

(51) Int. Cl.
*C08G 18/75* (2006.01)
*C08K 5/18* (2006.01)
*C08K 5/053* (2006.01)
*C08K 5/24* (2006.01)
*C08G 18/42* (2006.01)

(52) U.S. Cl.
CPC ..... *C08G 18/7621* (2013.01); *C08G 18/7671* (2013.01); *C08G 18/7678* (2013.01); *C08K 5/053* (2013.01); *C08K 5/18* (2013.01); *C08K 5/24* (2013.01)

(58) Field of Classification Search
CPC ...... C08G 18/7678; C08K 5/053; C08K 5/18; C08K 5/24
See application file for complete search history.

(56) References Cited

U.S. PATENT DOCUMENTS

| | | | | |
|---|---|---|---|---|
| 3,745,076 | A * | 7/1973 | Sickman | C06B 45/105 149/19.5 |
| 4,355,154 | A | 10/1982 | Saam et al. | |
| 4,366,301 | A * | 12/1982 | Le Roy | C08G 18/675 156/330.9 |
| 5,844,165 | A * | 12/1998 | Canterberry | C06B 45/105 149/19.5 |
| 9,758,672 | B2 * | 9/2017 | Brown | C08L 75/06 |
| 9,816,881 | B2 | 11/2017 | Dehe et al. | |
| 10,519,292 | B2 | 12/2019 | Yao et al. | |
| 10,557,011 | B2 | 2/2020 | Yao et al. | |
| 10,696,786 | B2 | 6/2020 | Straessler et al. | |
| 2008/0293841 | A1 | 11/2008 | Andrew et al. | |
| 2015/0307742 | A1 * | 10/2015 | Brutto | C09J 175/12 524/591 |

FOREIGN PATENT DOCUMENTS

| | | | |
|---|---|---|---|
| EP | 1345975 B1 | 5/2008 | |
| EP | 2935388 B1 | 2/2017 | |
| ES | 2372991 T3 | 1/2012 | |
| GB | 949086 A * | 2/1964 | .......... C08G 18/384 |
| WO | WO-9910400 A1 | 3/1999 | |

OTHER PUBLICATIONS

McDea, SDS, vol. 77, No. 58. Mar. 26, 2012. p. 1-8.*
Moca, SDS, vol. 77, No. 58. Mar. 26, 2012. p. 1-8.*
Abusaidi, H., et al., "Influences of NCO/OH and triol/diol Ratios on the Mechanical Properties of Nitro-HTPB Based Polyurethane Elastomers," *Iran J Chem Chem Eng* 36(5):55-63, Iranian Research Institute of Development in Chemical Industries, Iran (2017).
Kim, S-M., et al., "Environmentally-Friendly Synthesis of Carbonate-Type Macrodiols and Preparation of Transparent Self-Healable Thermoplastic Polyurethanes," *Polymers* 9(12):663, 16 pages, Multidisciplinary Digital Publishing Institute, Switzerland (2017).
Non-Final Office Action directed to related U.S. Appl. No. 16/925,130, dated Dec. 16, 2020; 13 pages.

* cited by examiner

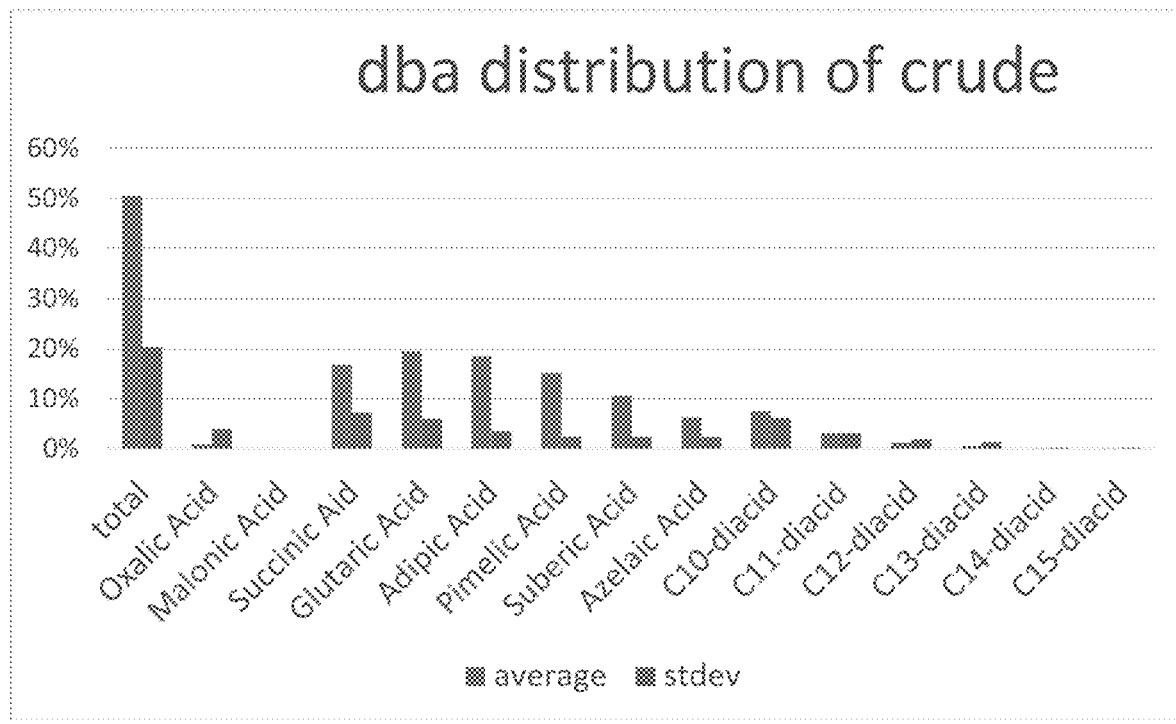

THERMOPLASTIC POLYURETHANE COMPOSITIONS COMPRISING NITRO-SUBSTITUTED POLYESTER DIOLS

FIELD OF THE INVENTION

This invention relates to the field of polymers. More specifically, the invention comprises thermoplastic polyurethane (TPU) compositions comprising polyesters containing dicarboxylic acids and nitro-substituted dicarboxylic acids from recycled feedstocks.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

TPU elastomers are used in a variety of applications such as footwear, automotive parts, tubes, hoses, as well as other applications. TPU elastomers are typically the reaction product of one or more diisocyanate compounds, one or more high equivalent weight diols (polyester or polyether), and one or more chain extenders. For many applications, the high equivalent weight diol of choice is a polyester diol, such as adipate polyester or polycaprolactone. Cast elastomers prepared from polyester diols in general have better mechanical properties than elastomers prepared from polyether diols. The polyester diols impart desirable mechanical properties and abrasion resistance to the TPU which makes the TPU elastomer useful in footwear applications. TPUs are expanding into novel application spaces such as 3D printing. Such applications require high hardness and tensile strength while retaining the desired flexibility of TPU elastomers.

Additionally, due to the environmental concerns surrounding petrochemical sources of polyester diols, companies are increasingly seeking to offer products of improved sustainability. However, there remains a need for these products to deliver equal or better performance than their traditional petroleum-based alternatives at a comparable price point.

SUMMARY OF THE INVENTION

The following embodiments and aspects thereof are described and illustrated in conjunction with systems, compositions, methods, and articles of manufacture which are meant to be exemplary and illustrative, not limiting in scope.

Post-consumer polyethylene waste provides an abundant source of raw material for making new chemicals. Nitro-functionalized diacids are the product of chemically recycled polyethylene via Accelerated Thermal Oxidative Decomposition (ATOD™). These diacids can be used to synthesize nitro-functionalized polyester diols which are a major building block for thermoplastic polyurethanes. These nitro-functionalized polyester diols are the first polyols synthesized from monomers derived from chemically recycled post-consumer polyethylene.

It would be desirable to provide a TPU elastomer from a polyester diol that is economical, is made from recycled content, and exhibits excellent mechanical properties.

It is, accordingly, an object of the invention to overcome deficiencies in the prior art described above. It is another object to provide polyester based TPU elastomers with increased hardness and tensile strength while maintaining elasticity.

This invention provides a TPU elastomer which is a polymer of (1) at least one high equivalent weight polyester diol containing nitro functionality on the backbone derived from mixtures of dicarboxylic acids and nitro-dicarboxylic acids, (2) at least one chain extender and (3) at least one diisocyanate.

In another embodiment, provided is a TPU elastomer which is a polymer of (1) 20-80% by weight of nitro-functionalized polyester diol ($NO_2$-PED) made from a mixture of dicarboxylic acids, nitro-dicarboxylic acids, and 1,4-butanediol, or a mixture thereof with at least one chain extender mixture, and (3) at least one polyisocyanate.

The invention also comprising a $NO_2$-PED synthesized from chemically recycled monomers derived from the decomposition of post-consumer polyethylene. The resulting TPU's provide a sustainable alternative to bio- or petrochemical-based TPU's.

We found that the unique nitro functionality on the high equivalent weight polyester diol component contributed to higher glass transition temperatures, higher tensile strength, and greater Shore A hardness.

Provided is a thermoplastic polyurethane elastomer composition comprising the reaction products of:

at least one nitro-substituted polyester diol ($NO_2$-PED), and at least one polyisocyanate, and further comprising the reaction product with at least one chain extender.

In some embodiments, $NO_2$-PED has the formula:

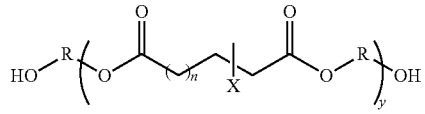

wherein n is 0-14, y is 1-100, X is H or $NO_2$, and R is alkylenyl, alkylenyl with one or more $CH_2$ groups substituted by —O—, cycloalkylenyl, or arylenenyl, wherein at least on X is $NO_2$.

In some embodiments, R is alkylenyl. In some embodiments, R is ethylenyl, propylenyl, isopropylenyl, butylenyl, pentylenyl, hexylenyl, heptylenyl, or octylenyl.

In some embodiments, R is alkylenyl, wherein one or more $CH_2$ groups are substituted by —O—.

In some embodiments, R is —$(CH_2)_o$—O—$(CH_2)_o$—, $CH_3$—O—$(CH_2)_o$—O—$(CH_2)_o$— $CH_3$, $(CH_3CH(OH)CH_2)_2O$, wherein o is 2-4.

In some embodiments, R is arylenyl or aralkylenyl.

In some embodiments, the $NO_2$-PED before reaction has a molecular weight of 400-10,000 g/mol.

In some embodiments, the chain extender is a dihydroxyalkane or dihydroxycycloalkane. In some embodiments, the chain extender is ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neo-pentyl glycol, 1,4-cyclohexanedimethanol, 1,4-dihydroxycyclohexane, or mixtures thereof.

In some embodiments, the chain extender is an alkylene or aralkylene diamine. In some embodiments, the chain extender is ethylene diamine, hexamethylene diamine, 1,4-cyclohexanylene diamine, or mixtures thereof. In some embodiments, the chain extender is an aromatic diamine. In some embodiments, the aromatic diamine is benzidine, dihydroxymethoxy hydroquinone, toluene diamine, diaminodiphenyl methane, phenylene diamine, or mixtures thereof.

In some embodiments, the chain extender is hydrazine.

In some embodiments, the chain extender is an amino alcohol. In some embodiments, the chain extender is ethanolamine, N-methylethanolamine, N-butylethanolamine, N-oleoylethanolamine, N-cyclohexylisopropanolamine, or mixtures thereof.

In some embodiments, the chain extender is a substituted aromatic diamine. In some embodiments, the chain extender is 4,4'-methylene-bis(o-chloroaniline), 4,4'-methylenebis(3-chloro-2,6-diethylaniline), or mixtures thereof.

In some embodiments, the thermoplastic polyurethane elastomer composition further comprises at least one crosslinking agent. In some embodiments, the crosslinking agent is glycerine, trimethylolpropane, diethanolamine, triethanolamine, or mixtures thereof.

In some embodiments, the ratio of polyisocyanate to active hydrogen containing group (the NCO index) is from 0.9-1.5.

In some embodiments, the isocyanate is 4,4'-diisocyanatodiphenylmethane (4,4'-MDI), 2,4'-diisocyanato diphenylmethane (2,4'-MDI), p-phenylene diisocyanate, 1,3-bis(isocyanatomethyl)cyclohexane, 1,4-diisocyanato cyclohexane, hexamethylene diisocyanate, isophorone diisocyanate, 1,5-naphthalene diisocyanate, 3,3'-dimethyl-4,4'-biphenyl diisocyanate, 4,4'-diisocyanato-dicyclohexylmethane, 2,6-toluene diisocyanate, 2,4-toluene diisocyanate, or mixtures thereof. In some embodiments, the isocyanate is 4,4'-MDI or 2,4'-MDI.

In some embodiments, the composition comprises one or more additives. In some embodiments, the one or more additives comprise at least one light stabilizer, UV stabilizer, or mixtures thereof. In some embodiments, the one or more additives are an inorganic filler, organic filler, or mixtures thereof. In some embodiments, the one or more additives are at least one inorganic filler that is a silicate mineral, metal oxide, metal salt, clay, metal silicate, glass fiber, natural fibrous material, synthetic fibrous mineral, or mixtures thereof. In some embodiments, the additive is an organic filler that is carbon black, fullerene, carbon nanotubes, biochar, melamine colophony, cellulose fibers, polyamide fibers, polyacrylonitrile fibers, polyurethane fibers, polyester fibers based on aromatic and/or aliphatic dicarboxylic acid esters, carbon fibers, or mixtures thereof. In some embodiments, the fillers are present in 0.5-30 percent by weight of the composition. In some embodiments, the filler comprises at least one flame retardant. In some embodiments, the at least one flame retardant is an organic phosphate, metal polyphosphate, metal oxide, metal salt, cyanuric acid derivative, or mixtures thereof. In some embodiments, the at least one flame retardant is present in in 500 to 4000 ppm in the composition.

In some embodiments, the composition comprises a foaming agent. In some embodiments, the foaming agent is at least one of water, pentane, cyclopentane, a hydrofluorocarbon, or mixtures thereof.

In some embodiments, the nitro-substituted polyester diols are esters of:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, and
b. at least one C8-C20 dicarboxylic acid substituted with a single nitro group;
and at least one polyol.

In some embodiments, the at least one polyol is a $C_{1-8}$ diol.

In some embodiments, the composition comprises 20-80% by weight of the nitro-substituted polyester diol.

In some embodiments, the composition further comprises the reaction products of
at least one polyester diol not substituted with a nitro group, and
at least one polyisocyanate, and further comprising the reaction product with
at least one chain extender.

Also provided is a method for making the compositions, comprising reacting:
at least one nitro-substituted polyester diol,
at least one polyisocyanate and
at least one chain extender.

In some embodiments, the reaction conditions comprise a temperature of 25 to 120° C.

Also provided is a thermoplastic polyurethane elastomer composition made by the methods described herein.

In some embodiments, the thermoplastic polyurethane elastomer composition is in the form of a foam containing:
(a) a polyester comprising at least one nitro-substituted polyester diol,
(b) at least one isocyanate,
(c) at least one chain extender,
(d) at least one flame retardant,
(e) at least one surfactant,
(f) at least one foaming agent, and
(g) at least one urethane catalyst.

In some embodiments, the method further comprises reacting at least one polyester diol not substituted with a nitro group.

In some embodiments, the dicarboxylic acids used to make the polyester diol and nitro-polyester diol are esters of:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, and
b. at least one C8-C20 dicarboxylic acid substituted with a single nitro group; and
at least one diol.

In some embodiments, the at least one diol is a $C_{1-8}$ diol.

BRIEF DESCRIPTION OF THE DRAWINGS

Exemplary embodiments are illustrated in referenced figures. It is intended that the embodiments and figures disclosed herein are to be considered illustrative rather than restrictive.

FIG. 1 depicts a bar graph showing the wt % of the dicarboxylic acids in the composition comprising nitro-substituted dicarboxylic acids.

DETAILED DESCRIPTION OF THE INVENTION

All references cited herein are incorporated by reference in their entirety as though fully set forth. Unless otherwise defined, all technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). As used herein, the term "comprising" or "comprises" means that other elements can also be present in addition to the defined elements presented. The use of "comprising" indicates inclusion rather than limitation. Although the open-ended term "comprising" as a synonym of terms such as including, containing, or having, is used herein to describe and claim the invention, the present invention, or embodiments thereof, may alternatively be described using alternative terms such as "consisting of" or "consisting essentially of".

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

Groupings of alternative elements or embodiments of the present invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

"Optional" or "optionally" means that the subsequently described circumstance may or may not occur, so that the description includes instances where the circumstance occurs and instances where it does not.

As used herein, the term "substituted" refers to independent replacement of one or more (typically 1, 2, 3, 4, or 5) of the hydrogen atoms on the substituted moiety with substituents independently selected from the group of substituents listed below in the definition for "substituents" or otherwise specified. In general, a non-hydrogen substituent can be any substituent that can be bound to an atom of the given moiety that is specified to be substituted. Examples of substituents include, but are not limited to, acyl, acylamino, acyloxy, aldehyde, alicyclic, aliphatic, alkanesulfonamido, alkanesulfonyl, alkaryl, alkenyl, alkoxy, alkoxycarbonyl, alkyl, alkylamino, alkylcarbanoyl, alkylene, alkylidene, alkylthios, alkynyl, amide, amido, amino, amidine, aminoalkyl, aralkyl, aralkylsulfonamido, arenesulfonamido, arenesulfonyl, aromatic, aryl, arylamino, arylcarbanoyl, aryloxy, azido, carbamoyl, carbonyl, carbonyls including ketones, carboxy, carboxylates, $CF_3$, cyano (CN), cycloalkyl, cycloalkylene, ester, ether, haloalkyl, halogen, halogen, heteroaryl, heterocyclyl, hydroxy, hydroxyalkyl, imino, iminoketone, ketone, mercapto, nitro, oxaalkyl, oxo, oxoalkyl, phosphoryl (including phosphonate and phosphinate), silyl groups, sulfonamido, sulfonyl (including sulfate, sulfamoyl and sulfonate), thiols, and ureido moieties, each of which may optionally also be substituted or unsubstituted. In some cases, two substituents, together with the carbon(s) to which they are attached to, can form a ring. In some cases, two or more substituents, together with the carbon(s) to which they are attached to, can form one or more rings.

Substituents may be protected as necessary and any of the protecting groups commonly used in the art may be employed. Non-limiting examples of protecting groups may be found, for example, in Greene and Wuts, Protective Groups in Organic Synthesis, $44^{th}$. Ed., Wiley & Sons, 2006.

The term "carboxy" means the radical —C(O)O—. It is noted that compounds described herein containing carboxy moiety can include protected derivatives thereof, i.e., where the oxygen is substituted with a protecting group. Suitable protecting groups for carboxy moieties include benzyl, tert-butyl, methyl, ethyl, and the like. The term "carboxyl" means —COOH.

The term "alkylenyl" refers to a divalent form of an alkyl group. In one embodiment, the alkyleneyl group is a $C_{3-8}$ alkyleneyl group. Examples of alkylenyl groups include methylenyl, ethylenyl, propylenyl, isopropylenyl, butylenyl, pentylenyl, and hexylenyl groups.

The term "arylenyl" refers to a divalent form of an optionally substituted aryl group. In one embodiment, the arylenyl is a divalent form of an optionally substituted phenyl. In one embodiment, the arylenyl is a divalent form of phenyl. Non-limiting exemplary alkylenyl groups include:

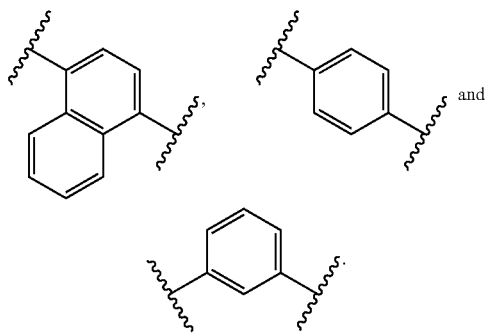

The term "cycloalkylenyl" refers to a divalent form of a C3-8 cycloalkyl group. Examples of cycloalkylenyl groups include 1,2-cyclobutenyl, 1,3-cyclobutenyl, 1,2-cyclopentenyl, 1,3-cyclopentenyl, 1,2-cyclohexenyl, 1,3-cyclohexenyl, and 1,4-cyclohexenyl.

The term "dihydroxycycloalkane" refers to a C3-8 cycloalkyl group substituted by two hydroxyl groups. Examples of dihydroxycycloalkanes include 1,2-dihydroxycyclobutane, 1,3-dihydroxycyclobutane, 1,2-dihydroxycyclopentane, 1,3-dihydroxycyclopentane, 1,2-dihydroxycyclohexane, 1,3-dihydroxycyclohexane, and 1,4-dihydroxycyclohexane.

The term "polymer" means a substance, chemical compound or mixture of compounds, that has a molecular structure consisting chiefly or entirely of a large number of similar units (e.g., monomer units) bonded together. Of which, linear polymer is also called straight-chain because it consists of a long string of carbon-carbon bonds; branching polymer has branches at irregular intervals along the polymer chain; cross linking polymer contains branches that connect polymer chains, via covalent, ionic, or H-bonding; optionally substituted polymer is a polymer that contains functionality at random points along the hydrocarbon chain backbone where one or more of the hydrogen atoms linked to the chain backbone may be, but are not required to be substituted with a substituent independently selected from the group of substituents provided herein in the definition for "substituents" or otherwise specified. Such polymers are said to be optionally substituted because they generally do not exhibit a regular substitution pattern along the chain backbone; addition polymer is formed by adding monomers to a growing polymer chain; condensation polymer is formed when a small molecule condenses out during the polymerization reaction; homopolymer is formed by polymerizing a single monomer; copolymer is formed by polymerizing more than one monomer; synthetic polymer is synthesized through chemical reactions; natural polymer is originated in nature and can be extracted; biopolymer is produced by living organisms, modified or natural; organic polymers are polymers that contain carbon atoms in the backbone of the polymer chain.

The term "oligomer" means a substance, chemical compound or mixture of compounds that has a molecular structure consisting chiefly or entirely of a few number of similar units (e.g., monomer units) bonded together.

The term "plastic" means a synthetic material comprising a wide range of organic polymers such as polyolefins, polyesters, polyamides, etc., that can be molded into shape while soft and then set into a rigid, semi-elastic, or elastic form.

The term "about" means the recited number±10%. For example, "about 100" means 90-110, inclusive.

Various Non-Limiting Embodiments of the Invention

It is an object of the present invention to provide thermoplastic polyurethane elastomers made starting with a dicarboxylic acid composition containing nitro-substituted dicarboxylic acids.

Nitro-Substituted Dicarboxylic Acid Compositions

Nitro-substituted dicarboxylic acid compositions may be prepared according to U.S. Pat. Nos. 10,519,292 and 10,557,011, the contents of which are fully incorporated by reference. The nitro-substituted dicarboxylic acids produced are in admixture with other dicarboxylic acids. The process comprises:

a. adding polyethylene (PE) to a reaction vessel;
b. adding aqueous nitric acid ($HNO_3$) to the reaction vessel to give a mixture, wherein the wt. ratio of PE to aqueous nitric acid is greater than 1:3; and
c. subjecting the mixture obtained in b. to conditions effective to decompose the PE to produce the dicarboxylic acids and nitro-substituted dicarboxylic acids.

The nitric acid may have a concentration of 10-90 wt %. In some embodiments, the nitric acid has a concentration of about 67 to 90 wt %. In some embodiments, the weight ratio of PE to nitric acid is 1:10 to 1:100. In some embodiments, a catalyst is added to the reaction such as a zeolite, alumina, silico-alumino-phosphate, sulfated zirconia, zinc oxide, titanium oxide, zirconium oxide, niobium oxide, iron carbonate, calcium carbide, or combinations thereof. In some embodiments, the conditions effective comprise a temperature range of about 60° C. to about 200° C. In some embodiments, the conditions effective comprise an initial pressure of 0-1000 psi. In some embodiments, the conditions effective comprise a batch process with a residence time in the reaction vessel of about 1 hour to about 10 hours. In some embodiments, the conditions effective comprise a continuous process. The dicarboxylic acids and nitro-dicarboxylic acids are then isolated, for example, by filtration of the mixture and evaporation of the nitric acid, e.g., under reduced pressure. The dicarboxylic acids and nitro-dicarboxylic acids may then be esterified, e.g., in the presence of an acid catalyst such as hydrochloric or sulphuric acids in the presence of an alcohol, e.g., a $C_{1-4}$ alcohol, to give the corresponding dicarboxylic and nitro-dicarboxylic acid $C_{1-4}$ esters. In some embodiments, the $C_{1-4}$ esters are methyl, ethyl, propyl, butyl, or pentyl esters.

In some embodiments, succinic acid is present in an amount of from about 10 to about 25 wt %, glutaric acid is present in an amount of from about 11 to about 25 wt %, adipic acid is present in an amount of about 14 to about 22 wt %, pimelic acid is present in an amount of about 10 to about 20 wt %, and azelaic acid is present in an amount of about 3 to about 10 wt %, or an equivalent amount of the esters thereof, and if present, oxalic acid is present in an amount up to 10 wt %, if present suberic acid is present in an amount of about 5 to about 16 wt %, if present sebacic acid is present in an amount of about 1 to about 15 wt %, if present undecanedioic acid is present in an amount of about 1 to about 8 wt %, if present dodecanedioic acid is present up to about 5 wt %, if present tridecanedioic acid is present up to about 4 wt %, if present tetradecanedioic acid is present up to about 2 wt %, if present pentadecanedioic acid is present up to about 1 wt %, if present hexadecanedioic acid is present up to about 1 wt %, if present heptadecanedioic acid is present up to about 1 wt %, and if present octadecanedioic acid is present up to about 1 wt % or an equivalent amount of the esters thereof.

In some embodiments, succinic acid is present in an amount of from about 15 to about 19 wt %, glutaric acid is present in an amount of from about 17 to about 21 wt %, adipic acid is present in an amount of about 16 to about 20 wt %, pimelic acid is present in an amount of about 13 to about 17 wt %, and azelaic acid is present in an amount of about 4 to about 8 wt %, or an equivalent amount of the esters thereof, and if present, oxalic acid is present in an amount up to 10 wt %, if present suberic acid is present in an amount of about 9 to about 13 wt %, if present sebacic acid is present in an amount of about 5 to about 9 wt %, if present undecanedioic acid is present in an amount of about 2 to about 4 wt %, if present dodecanedioic acid is present in an amount of about 1 to about 3 wt %, if present tridecanedioic acid is present in an amount of about 0.5 to about 1.5 wt %, if present tetradecanedioic acid is present up to about 0.2 wt %, if present pentadecanedioic acid is present up to about 0.2 wt %, if present hexadecanedioic acid is present up to about 0.2 wt %, if present heptadecanedioic acid is present up to about 0.2 wt %, and if present octadecanedioic acid is present up to about 0.2 wt % or an equivalent amount of the esters thereof.

In some embodiments, succinic acid is present in an amount of from about 5 to about 40 wt %, glutaric acid is present in an amount of from about 8 to about 27 wt %, adipic acid is present in an amount of about 10 to about 29 wt %, pimelic acid is present in an amount of about 10 to about 20 wt %, and azelaic acid is present in an amount of about 1 to about 13 wt %, or an equivalent amount of the esters thereof, and if present, oxalic acid is present in an amount up to 10 wt %, if present suberic acid is present in an amount of to about 4 to about 20 wt %, if present sebacic acid is present up to about 12 wt %, if present undecanedioic acid is present up to about 8 wt %, if present dodecanedioic acid is present up to about 5 wt %, if present tridecanedioic acid is present up to about 4 wt %, if present tetradecanedioic acid is present up to about 2 wt %, if present pentadecanedioic acid is present up to about 0.4 wt %, if present hexadecanedioic acid is present up to about 0.4 wt %, if present heptadecanedioic acid is present up to about 0.4 wt %, and if present octadecanedioic acid is present up to about 0.4 wt % or an equivalent amount of the esters thereof.

In some embodiments, the dicarboxylic acids further comprise at least one $C_8$-$C_{20}$ dicarboxylic acid substituted with a single nitro group or the esters thereof. The nitro-substituted $C_8$-$C_{20}$ dicarboxylic acids may be substituted in the 2-, 3-, 4-, 5-, 6-, 7-, or 8-position of the dicarboxylic acid.

In some embodiments, at least one nitro-substituted dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof.

In some embodiments, the dicarboxylic acids comprise:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, or the esters thereof, and
b. at least one $C_8$-$C_{20}$ dicarboxylic acid substituted with a single nitro group, or the esters thereof.

In some embodiments, the at least one $C_8$-$C_{20}$ dicarboxylic acid substituted with a single nitro group is nitro-suberic acid, nitro-azelaic acid, nitro-sebacic acid, nitro-undecanedioic acid, nitro-dodecanedioic acid, nitro-brassylic acid, nitro-tetradecanedioic acid, nitro-pentadecanedioic acid, nitro-hexadecanedioic acid, nitro-heptadecanedioic acid, nitro-octadecanedioic acid, nitro-nonadecanedioic acid, or nitro-icosanedioic acid, or the esters thereof. In some embodiments, the $C_8$-$C_{20}$ dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof. In some embodiments, the $C_8$-$C_{20}$ dicarboxylic acid is 3-nitro-suberic acid, 3-nitro-azelaic acid, 3-nitro-sebacic acid, 3-nitro-undecanedioic acid, 3-nitro-dodecanedioic acid, 3-nitro-brassylic acid, 3-nitro-tetradecanedioic acid, 3-nitro-pentadecanedioic acid, 3-nitro-hexadecanedioic acid, 3-nitro-heptadecanedioic acid, 3-nitro-octadecanedioic acid, 3-nitro-nonadecanedioic acid, or 3-nitro-icosanedioic acid, or the esters thereof. In some embodiments, the $C_8$-$C_{20}$ dicarboxylic acid is 4-nitro-suberic acid, 4-nitro-azelaic acid, 4-nitro-sebacic acid, 4-nitro-undecanedioic acid, 4-nitro-dodecanedioic acid, 4-nitro-brassylic acid, 4-nitro-tetradecanedioic acid, 4-nitro-pentadecanedioic acid, 4-nitro-hexadecanedioic acid, 4-nitro-heptadecanedioic acid, 4-nitro-octadecanedioic acid, 4-nitro-nonadecanedioic acid, or 4-nitro-icosanedioic acid, or the esters thereof. In some embodiments, the $C_8$-$C_{20}$ dicarboxylic acid is 5-nitro-suberic acid, 5-nitro-azelaic acid, 5-nitro-sebacic acid, 5-nitro-undecanedioic acid, 5-nitro-dodecanedioic acid, 5-nitro-brassylic acid, 5-nitro-tetradecanedioic acid, 5-nitro-pentadecanedioic acid, 5-nitro-hexadecanedioic acid, 5-nitro-heptadecanedioic acid, 5-nitro-octadecanedioic acid, 5-nitro-nonadecanedioic acid, or 5-nitro-icosanedioic acid, or the esters thereof. In some embodiments, the at least one $C_8$-$C_{20}$ dicarboxylic acid substituted with a single nitro group is present up to about 70 wt % in the decomposition mixture.

In some embodiments, the nitro-dicarboxylic acid composition comprises the dicarboxylic acids in the amounts shown in FIG. 1.

Esters of Dicarboxylic Acids Composition

In some embodiments, the dicarboxylic acids and nitro-dicarboxylic acids are in an ester form. These esters are prepared under esterification conditions. In some embodiments, the dicarboxylic acids are at least partially in the form of esters.

In some embodiments, the esters are methyl esters, ethyl esters, propyl esters, isopropyl esters, butyl esters, isobutyl esters, sec-butyl esters, tert-butyl esters, pentyl esters, or hexyl esters, or combinations thereof. In some embodiments, the ester is a methyl ester. In some embodiments, the converting is carried out by esterification or esterifying.

Any suitable esterification conditions known in the art may be used to form the esters. For example, the dicarboxylic acids and nitro-dicarboxylic acids can be admixed with at least one alcohol and the admixture heated to cause esterification. A mineral acid or organic acid may be added as a catalyst. In some embodiments, the at least one alcohol is at least one selected from a group consisting of linear alcohol, branched alcohol, cyclic alcohol, and combinations thereof. In some embodiments, the at least one alcohol is at least one selected from the group consisting of methanol, ethanol, propanol, isopropanol, butanol, isobutanol, secbutanol, tert-butanol, pentanol, hexanol, and combinations thereof. In some embodiments, the at least one alcohol is a $C_1$-$C_{10}$ alcohol. In some embodiments, the at least one alcohol is a $C_1$-$C_4$ alcohol. In some embodiments, the at least one alcohol is methanol.

In some embodiments, the succinic acid, glutaric acid, adipic acid, pimelic acid, suberic acid, and azelaic acid are each independently in an ester form.

In some embodiments, the oxalic acid, suberic acid, sebacic acid, undecanedioic acid, dodecanedioic acid, tridecanedioic acid, tetradecanedioic acid, pentadecanedioic acid, 2-octenedioic acid, 2-nonenedioic acid, 2-decenedioic acid, and 2-undecenedioic acid are independently in an ester form.

In some embodiments, the 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, and 2-nitro-icosanedioic acid are independently in an ester form.

In some embodiments, the $C_8$-$C_{20}$ dicarboxylic acid substituted with a single nitro group is in an ester form. In some embodiments, the $C_8$-$C_{20}$ dicarboxylic acid substituted with a single nitro group in the form of an ester is nitro-suberic acid, nitro-azelaic acid, nitro-sebacic acid, nitro-undecanedioic acid, nitro-dodecanedioic acid, nitro-brassylic acid, nitro-tetradecanedioic acid, nitro-pentadecanedioic acid, nitro-hexadecanedioic acid, nitro-heptadecanedioic acid, nitro-octadecanedioic acid, nitro-nonadecanedioic acid, or nitro-icosanedioic acid. In some embodiments, the $C_8$-$C_{20}$ dicarboxylic acid is 2-nitro-suberic acid, 2-nitro-azelaic acid, 2-nitro-sebacic acid, 2-nitro-undecanedioic acid, 2-nitro-dodecanedioic acid, 2-nitro-brassylic acid, 2-nitro-tetradecanedioic acid, 2-nitro-pentadecanedioic acid, 2-nitro-hexadecanedioic acid, 2-nitro-heptadecanedioic acid, 2-nitro-octadecanedioic acid, 2-nitro-nonadecanedioic acid, or 2-nitro-icosanedioic acid, or the esters thereof. In some embodiments, the ester form is selected from the group consisting of monoester, diester, multiester, mixed diester, mixed multiester, and combinations thereof.

The term "multiester" as used herein means an ester formed by converting more than one carboxyl group from a dicarboxylic acid form to an ester form under esterification conditions.

In some embodiments, the at least one ester comprises dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, dimethyl oxalate, dimethyl tridecanedioate, dimethyl tetradecanedioate, dimethyl pentadecanedioate, dimethyl 2-octendioate, dimethyl 2-nonendioate, 2-dimethyl 2-decendioate, dimethyl 2-undecendioate, dimethyl 2-nitro-suberate, dimethyl 2-nitro-azelate, dimethyl 2-nitro-sebacate, dimethyl 2-nitro-undecanedioate, dimethyl 2-nitro-dodecanedioate, dimethyl 2-nitro-brassylate, dimethyl 2-nitro-heptadecanedioate, dimethyl 2-nitro-octadecanedioate, dimethyl 2-nitro-tetradecanedioate, dimethyl 2-nitro-pentadecanedioate, dimethyl 2-nitro-hexadecanedioate, 2-nitro-heptadecanedioate, dimethyl 2-nitro-suberate, dimethyl 2-nitro-sebacate, dimethyl 2-nitro-undecanedioate, dimethyl 2-nitro-dodecanedioate, dimethyl 2-nitro-tetradecanedioate, dimethyl 2-nitro-pentadecanedioate, dimethyl 3-nitro-suberate, dimethyl 3-nitro-azelate, dimethyl 3-nitro-sebacate, dimethyl 3-nitro-undecanedioate, dimethyl 3-nitro-dodecanedioate, dimethyl 3-nitro-brassylate, dimethyl 3-nitro-heptadecanedioate, dimethyl 3-nitro-octadecanedioate, dimethyl 3-nitro-tetradecanedioate, dimethyl 3-nitro-pentadecanedioate, dimethyl 3-nitro-hexadecanedioate, 3-nitro-heptadecanedioate, dimethyl 3-nitro-suberate, dimethyl 3-nitro-sebacate, dimethyl 3-nitro-undecanedioate, dimethyl 3-nitro-dodecanedioate, dimethyl 3-nitro-tetradecanedioate, dimethyl 3-nitro-pentadecanedioate, dimethyl 4-nitro-suberate, dimethyl 4-nitro-azelate, dimethyl 4-nitro-sebacate, dimethyl 4-nitro-undecanedioate, dimethyl 4-nitro-dodecanedioate, dimethyl 4-nitro-brassylate, dimethyl 4-nitro-heptadecanedioate, dimethyl 4-nitro-octadecanedioate, dimethyl 4-nitro-tetradecanedioate, dimethyl 4-nitro-pentadecanedioate, dimethyl 4-nitro-hexadecanedioate, 4-nitro-heptadecanedioate, dimethyl 4-nitro-suberate, dimethyl 4-nitro-sebacate, dimethyl 4-nitro-undecanedioate, dimethyl 4-nitro-dodecanedioate, dimethyl 4-nitro-tetradecanedioate, dimethyl 4-nitro-pentadecanedioate, dimethyl 5-nitro-suberate, dimethyl 5-nitro-azelate, dimethyl 5-nitro-sebacate, dimethyl 5-nitro-undecanedioate, dimethyl 5-nitro-dodecanedioate, dimethyl 5-nitro-brassylate, dimethyl 5-nitro-heptadecanedioate, dimethyl 5-nitro-octadecanedioate, dimethyl 5-nitro-tetradecanedioate, dimethyl 5-nitro-pentadecanedioate, dimethyl 5-nitro-hexadecanedioate, 5-nitro-heptadecanedioate, dimethyl 5-nitro-suberate, dimethyl 5-nitro-sebacate, dimethyl 5-nitro-undecanedioate, dimethyl 5-nitro-dodecanedioate, dimethyl 5-nitro-tetradecanedioate, and dimethyl 5-nitro-pentadecanedioate, and combinations thereof.

In some embodiments, the at least one corresponding ester comprises dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, and combinations thereof.

In some embodiments, the at least one ester comprises of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the at least one corresponding ester is comprises of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the esterification mixture comprises a composition comprising at least one of dimethyl succinate, dimethyl glutarate, dimethyl adipate, dimethyl pimelate, dimethyl suberate, dimethyl azelate, dimethyl sebacate, dimethyl undecanedioate, dimethyl dodecanedioate, and combinations thereof.

In some embodiments, the esterification mixture comprises a composition comprising at least one of 5-50% dimethyl succinate, 5-50% dimethyl glutarate, 5-50% dimethyl adipate, 5-50% dimethyl pimelate, 0-30% dimethyl suberate, 0-30% dimethyl azelate, 0-20% dimethyl sebacate, 0-10% dimethyl undecanedioate, 0-10% dimethyl dodecanedioate, and combinations thereof.

In some embodiments, the esterification mixture comprises at least one of dimethyl succinate in an amount of from about 5 to about 18 wt %, dimethyl glutarate in an amount of from about 8 to about 28 wt %, dimethyl adipate in an amount of about 10 to about 29 wt %, dimethyl pimelate in an amount of about 10 to about 20 wt %, and dimethyl azelate in an amount of about 8 to about 13 wt %, and combinations thereof.

In some embodiments, the esterification mixture comprises at least one of dimethyl oxalate in an amount up to 10 wt %, dimethyl suberate in an amount of about 9 to about 20 wt %, dimethyl sebacate in an amount of about 1 to about 10 wt %, dimethyl undecanedioate in an amount of about 1 to about 8 wt %, dimethyl dodecanedioate up to about 5 wt %, dimethyl tridecanedioate up to about 4 wt %, dimethyl tetradecanedioate up to about 2 wt %, and dimethyl pentadecanedioate up to about 0.4 wt %, and combinations thereof.

In some embodiments, the esterification mixture comprises at least one of dimethyl succinate in an amount of from about 5 to about 40 wt %, dimethyl glutarate in an amount of from about 8 to about 27 wt %, dimethyl adipate in an amount of about 10 to about 29 wt %, dimethyl pimelate in an amount of about 10 to about 20 wt %, and dimethyl azelate in an amount of about 1 to about 13 wt %, and combinations thereof.

In some embodiments, the esterification mixture comprises at least one of dimethyl oxalate in an amount up to 10 wt %, dimethyl suberate in an amount of to about 4 to about 20 wt %, dimethyl sebacate up to about 10 wt %, dimethyl undecanedioate up to about 8 wt %, dimethyl dodecanedioate up to about 5 wt %, dimethyl tridecanedioate up to about 4 wt %, dimethyl tetradecanedioate up to about 2 wt %, and dimethyl pentadecanedioate up to about 0.4 wt %, and combinations thereof.

In some embodiments, the esters are of:
a. oxalic acid, succinic acid, glutaric acid, adipic acid, pimelic acid, suberic acid, azelaic acid, C10-dicarboxylic acid, C11-dicarboxylic acid, C12-dicarboxylic acid, C13-dicarboxylic acid, C14-dicarboxylic acid and C15-dicarboxylic acid, and
b. at least one C8-C20 dicarboxylic acid substituted with a single nitro group;
and at least one polyol.

In some embodiments, the method further comprises separating the at least one corresponding ester. In some embodiments, the separating is carried out by distillation. In some embodiments, the distillation is at least one selected from the group consisting of simple distillation, fractional distillation, vacuum distillation, azeotropic distillation, co-distillation, and combinations thereof.

In some embodiments, the method further comprises converting the at least one compound containing at least one carboxyl group from the ester form to an acid form (e.g., converting the ester form back to the acid form). In some embodiments, the converting of the ester form to the acid form is performed under ester hydrolysis conditions.

Nitro-Functionalized Polyester Diols ($NO_2$-PED) Composition

The invention also provides nitro-functionalized polyester diols ($NO_2$-PED) by reacting the dicarboxylic acids and nitro-dicarboxylic acids or esters thereof with a diol.

Polyester diols have the formula:

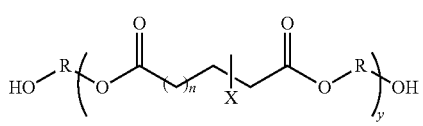

wherein n is 0-14, y is 1-100, X is H or $NO_2$, and R is alkylenyl, alkylenyl with one or more $CH_2$ groups substituted by —O—, cycloalkylenyl, or arylenenyl, wherein at least one X is $NO_2$.

In some embodiments, R is ethylenyl, propylenyl, isopropylenyl, butylenyl, pentylenyl, hexylenyl, heptylenyl, or octylenyl. In some embodiments, R is alkylenyl, wherein one or more $CH_2$ groups are substituted by —O—. In some embodiments, R is —$(CH_2)_o$—O—$(CH_2)_o$—, $CH_3$—O—$(CH_2)_o$—O—$(CH_2)_o$— $CH_3$, $(CH_3CH(OH)CH_2)_2O$, wherein o is 2-4. In some embodiments, polyester diol before reaction with the isocyanate has a molecular weight of 300-10,000 g/mol.

Examples of diols include, for instance, 1,2-propanediol, 1,3-propanediol, 1,4-butanediol, 1,2-butanediol, 1,3-butanediol, 1,5-pentanediol, 1,6-hexanediol, 1,9-nonanediol, 1,10-decandiol, ethylene glycol, diethylene glycol, triethylene glycol, polyethylene glycol, dipropylene glycol, tripropylene glycol, glycerol, trimethylol ethane, trimethylol propane, neo-pentyl glycol, pentaerythritol, dipentaerythritol, sorbitol, 2-methyl-1,3-propane diol, 2,2-dimethyl-1,3-propanediol, 2-ethyl-1,3-propanediol, 2,2-diethyl-1,3-propanediol, 2-propyl-2-methyl-1,3-propanediol, 2-propyl-2-ethyl-1,3-propanediol, 2-butyl-2-ethyl-1,3-propanediol (BEPD), hydroxy pivaloyl hydroxy pivalate (HPHP), 2-cyclohexyl-2-methyl-1,3-propanediol, 2-phenyl-2-methyl-1,3-propanediol, 1,4-cyclohexanediol, 2,4-diethyl-1,5-pentanediol, dihydroxymethoxy hydroquinone, 1,4-cyclohexanedimethanol, and 1,4-dihydroxycyclohexane. In some embodiments, the diols are $C_{1-8}$ diols, e.g. or $C_{1-4}$ diols, for instance diethylene glycol, 1,2-propanediol, and 1,3-propanediol.

The $NO_2$-PEDs are prepared by reacting the dicarboxylic acids and nitro-carboxylic acids or esters thereof under suitable reaction conditions. In some embodiments, the $NO_2$-PEDs are synthesized according to the following general procedure and as represented in Scheme 1: The dicarboxylic acid mixture is combined with diol (e.g. 1,6-hexanediol) and a catalytic amount of concentrated sulfuric acid or other suitable catalyst; catalyst loading may vary between 0.2 mole percent (mol %) to 4 mol %. The mixture is heated while stirring in a pre-warmed oil bath at 100-110° C. for 2-4 hours under atmospheric pressure, followed by application of reduced pressure (≤19 mbar) for 1-2 hours. The product is cooled under vacuum, and characterized by ATR-FTIR analysis and end group titration (total acid number and hydroxyl number). Titrations are performed using Test Method A according to ASTM D-4274-99 with slight modifications, and results are used to calculate approximate polyester diol molecular weight. Polyester diols stored outside of a desiccator for prolonged periods are dried prior to use by overnight incubation in a vacuum oven at 80° C., or by bubbling dry inert gas (e.g. argon) through the polyol at ≥100° C. while simultaneous applying vacuum for 1 hour, followed by storage in an ambient pressure desiccator. The reaction is typically carried out at atmospheric pressure, but other pressures may be used.

Scheme 1

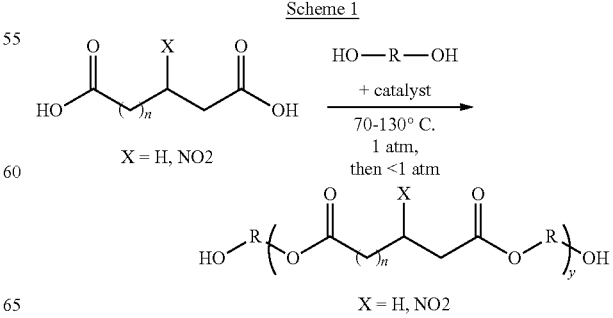

In Scheme 1, n is 0-20, and y is 1-100. In some embodiments, y is 1-30.

In another embodiment, the NO$_2$-PEDs are prepared by reacting the esters of the dicarboxylic acids and nitro-dicarboxylic acids with the polyol also in the presence of a suitable catalyst such as sulfuric acid or other mineral acid according to Scheme 2.

Scheme 2

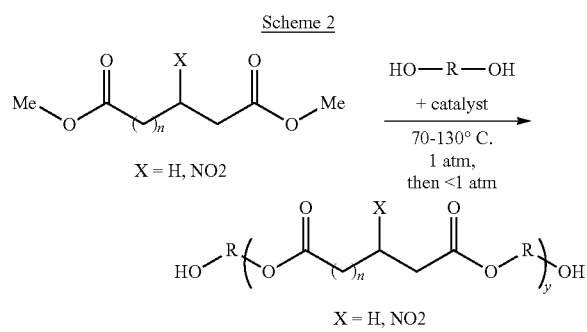

X = H, NO2

In Scheme 2, n is 0-20, and y is 1-100. In some embodiments, y is 1-30.

The catalyst may be hydrochloric acid, sulphuric acid, or other mineral acid. In the alternative, the catalyst may be dibutyl tin(IV) dilaurate in an organic solvent such as heptane. The mixture may be heated while stirring at 100-130° C. for 1-20 hours under atmospheric pressure and the alcohol by-product (e.g., methanol) and organic solvent, if used (e.g., heptane), is evaporated and removed from the reactor. In some embodiments, this is followed by application of reduced pressure (≤19 mbar) for 1-20 hours. Removal of the alcohol by-product and organic solvent may also be removed by bubbling an inert gas though the mixture while applying a vacuum for 1 hour.

The number average molecular weight of the NO$_2$-PEDs range from 300 to 10000 g/mol. In some embodiments, the number average molecular weight is about 500 to about 4000 g/mol.

Thermoplastic Polyurethanes (TPU)

TPUs may be prepared by a one-step or two-step method. In the one-step method, the NO$_2$-PED and chain extender are blended in a reaction vessel. The polyisocyanate is slowly added the the vessel while stirring vigorously. The reaction proceeds at temperatures 60-120° C. for 2.5 hours. The resulting TPU is then cast into a pre-heated silicone mold and cured, for example, 20 to 48 hours at a temperature of 80 to 120° C. The two-step method involves reacting the NO$_2$-PEDs with a polyisocyanate to give a TPU pre-polymer followed by chain extension to yield a finished TPU elastomer. The NO$_2$-PED is reacted with a polyisocyanate at temperatures up to 80° C. A catalyst and chain extender is then added while stirring rapidly and allowed to react at temperatures up to 120° C. The catalyst may be any tin laureate, or amine catalyst such as DABCO or triethylamine at a wt % of 0.05 to 1.0 compared to the NO$_2$-PEDs. The NO$_2$-PED can be 20-80 wt % of the chain extended TPU. The polyisocyanate can be 20-80 wt % of the chain extended TPU. The chain extender can be 1-20 wt % of the chain extended TPU.

The chain extended TPU is then poured into a mold and allowed to cure, for example, 20 to 48 hours at a temperature of 80 to 120° C.

Examples of polyisocyanates include, for instance, 2,4-tolylene diisocyanate, 2,6-tolylene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexyl methane diisocyanate, methylenebis(4-cyclohexylisocyanate), hydrogenated diphenylmethane diisocyanate, 2,2,4-trimethylhexamethylene diisocyanate, bis(2-isocyanateethyl)fumarate, 6-isopropyl-1,3-phenyl diisocyanate, 4-diphenylpropane diisocyanate, lysine diisocyanate, and mixtures thereof. In one embodiment, the polyisocyanate comprises an aromatic ring.

In some embodiments, the polyisocyanate is 4,4'-diisocyanatodiphenylmethane (4,4'-MDI), 2,4'-diisocyanato diphenylmethane (2,4'-MDI), p-phenylenediisocyanate, 1,3-bis(isocyanatomethyl)-cyclohexane, 1,4-diisocyanato-cyclohexane, hexamethylenediisocyanate, isophorone diisocyanate, 1,5-naphthalene diisocyanate, 3,3'-dimethyl-4,4'-biphenyldiisocyanate, 4,4'-diisocyanato-dicyclohexylmethane, 2,6-toluene diisocyanate, 2,4-toluene diisocyanate, and mixtures thereof.

In some embodiments, the ratio of polyisocyanate to active hydrogen containing group (the NCO index) is from 0.9-1.5. As is known in the art, the NCO index is defined as the number of equivalents of isocyanate, divided by the total number of equivalents of active hydrogen, multiplied by 100. The NCO index is represented by the following formula:

$$\text{NCO index} = \left[\frac{NCO}{OH + NH}\right] * 100$$

The TPU pre-polymer is then reacted with a chain extender. Examples of chain extenders include diols such as 1,2-propanediol, 1,3-propanediol, 1,4-butanediol, 1,2-butanediol, 1,3-butanediol, 1,5-pentanediol, 1,6-hexanediol, 1,9-nonanediol, 1,10-decandiol, ethylene glycol, diethylene glycol, triethylene glycol, polyethylene glycol, dipropylene glycol, tripropylene glycol, glycerol, trimethylol ethane, trimethylol propane, neo-pentyl glycol, pentaerythritol, dipentaerythritol, sorbitol, 2-methyl-1,3-propane diol, 2,2-dimethyl-1,3-propanediol, 2-ethyl-1,3-propanediol, 2,2-diethyl-1,3-propanediol, 2-propyl-2-methyl-1,3-propanediol, 2-propyl-2-ethyl-1,3-propanediol, 2-butyl-2-ethyl-1,3-propanediol (BEPD), hydroxy pivaloyl hydroxy pivalate (HPHP), 2-cyclohexyl-2-methyl-1,3-propanediol, 2-phenyl-2-methyl-1,3-propanediol, 1,4-cyclohexanediol, 2,4-diethyl-1,5-pentanediol, dihydroxymethoxy hydroquinone, 1,4-cyclohexanedimethanol, and 1,4-dihydroxycyclohexane. In some embodiments, the polyols are $C_{1-8}$ polyols, e.g. $C_{1-8}$ diols or $C_{1-4}$ diols, for instance diethylene glycol, 1,2-propane diol, and 1,3-propane diol.

In some embodiments, the chain extender is a dihydroxyalkane or dihydroxycycloalkane. In another embodiment, the chain extender is ethylene glycol, diethylene glycol, triethylene glycol, propylene glycol, dipropylene glycol, tripropylene glycol, 1,3-propane diol, 1,4-butanediol, 1,6-hexanediol, 1,10-decanediol, neo-pentyl glycol, 1,4-cyclohexanedimethanol, 1,4-dihydroxycyclohexane, or mixtures thereof. In some embodiments, the chain extender is an alkylene or aralkylene diamine. In some embodiments, the chain extender is ethylene diamine, hexamethylene diamine, 1,4-cyclohexanylene diamine, or mixtures thereof. In some embodiments, the chain extender is an aromatic diamine. In some embodiments, the chain extender is benzidine, dihydroxymethoxy hydroquinone, toluene diamine, diaminodiphenyl methane, phenylene diamine, or mixtures thereof. In some embodiments, the chain extender is hydrazine. In some embodiments, the chain extender is an amino alcohol. In some embodiments, the chain extender is ethanolamine, N-methylethanolamine, N-butylethanolamine, N-oleoylethanolamine, N-cyclohexylisopropanolamine, or mixtures thereof. In some embodiments, the chain extender is a substituted aromatic diamine. In some embodiments, the chain extender is 4,4'-methylene-bis(o-chloroaniline), 4,4'-methylenebis(3-chloro-2-6-diethylaniline, or mixtures thereof.

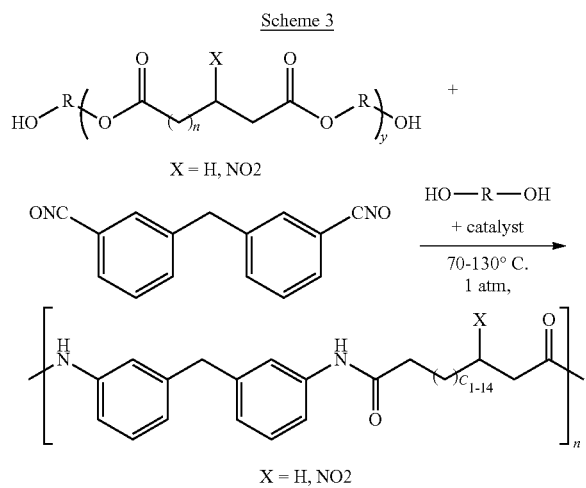

Scheme 3

X = H, NO2

X = H, NO2

Optional Additives

There are a number of optional additives for the TPU compositions of the invention. The optional additives include further crosslinking agents, oligomers, light stabilizers, UV stabilizers, inorganic and organic fillers, flame retardants, dispersants, foaming agents, reactive diluents, free radical photoinitiators, cationic photoinitiators, and other additives.

In some embodiments, the crosslinking agent is glycerine, trimethylolpropane, diethanolamine, triethanolamine, or mixtures thereof.

In some embodiments, further oligomers include, for instance, polyethers, polyesters, polycarbonates, polyacrylates, and copolymers thereof. The further oligomers may comprise one or more (e.g. two or more) hydroxy groups, comprise one or more (e.g. two or more) ethylenically unsaturated groups, and/or comprise one or more (e.g. two or more) epoxy groups. In one embodiment, the present compositions comprise, relative to the total weight of the composition, 0-60 wt % of further oligomers, e.g. 5-40 wt %.

In some embodiments, the light and UV stabilizers include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), 2,2'-p-phenylenebis(1,3-benzoxazin-4-one), and mixtures thereof.

In some embodiments, the inorganic filler comprises a silicate mineral, metal oxide, metal salt, clay, metal silicate, glass fiber, natural fibrous material, synthetic fibrous mineral, or mixtures thereof.

In some embodiments, the organic filler comprises carbon black, fullerene, carbon nanotubes, biochar, melamine colophony, cellulose fibers, polyamide fibers, polyacrylonitrile fibers, polyurethane fibers, polyester fibers based on aromatic and/or aliphatic dicarboxylic acid esters, carbon fibers, or mixtures thereof.

In some embodiments, the fillers are present in 0.5-30 percent by weight of the composition.

In some embodiments, the flame retardant is an organic phosphate, metal polyphosphate, metal oxide, metal salt, cyanuric acid derivative, or mixtures thereof.

In some embodiments, flame retardant is present in in 10 to 35 percent by weight of the composition.

In some embodiments, the dispersant comprises styrene, an acrylic ester, a di- and tri-acrylate/methacrylate, an ester acrylate/methacrylate, urethane or urea acrylate/methacrylate, or mixtures thereof.

In some embodiments, the foaming agent is at least one of water, pentane, cyclopentane, a hydrofluorocarbon, or mixtures thereof.

Examples of reactive diluents include monofunctional monomers and polyfunctional monomers. Examples of monofunctional monomers include monomers containing a vinyl group, such as N-vinyl pyrrolidone, N-vinyl caprolactam, vinyl imidazole, vinyl pyridine; isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, benzyl(meth)acrylate, 4-butylcyclohexyl(meth)acrylate, acryloyl morpholine, 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl (meth)acrylate, butyl(meth)acrylate, amyl(meth)acrylate, isobutyl (meth)acrylate, t-butyl(meth)acrylate, pentyl(meth)acrylate, caprolactone acrylate, isoamyl(meth)acrylate, hexyl(meth)acrylate, heptyl(meth)acrylate, octyl(meth)acrylate, isooctyl (meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isostearyl(meth)acrylate, tetrahydrofurfuryl(meth)acrylate, butoxyethyl(meth)acrylate, ethoxydiethylene glycol (meth)acrylate, benzyl(meth)acrylate, phenoxyethyl(meth)acrylate, polyethylene glycol mono (meth)acrylate, polypropylene glycol mono(meth)acrylate, methoxyethylene glycol (meth)acrylate, ethoxyethyl(meth)acrylate, methoxypolyethylene glycol (meth)acrylate, methoxypolypropylene glycol (meth)acrylate, diacetone (meth)acrylamide, isobutoxymethyl(meth)acrylamide, N,N-dimethyl (meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl (meth)acrylamide, N,N-dimethylaminopropyl(meth)acrylamide, hydroxybutyl vinyl ether, lauryl vinyl ether, cetyl vinyl ether, 2-ethylhexyl vinyl ether; and compounds represented by the following formula (2) $CH_2C(R^6)$—$COO(R^7O)_m$—$R^8$ (2) wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl (meth)acrylate, ethoxylated lauryl(meth)acrylate, and the like.

Examples of polyfunctional monomers include monomers containing two or more (meth)acrylate groups such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neo-pentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecane diyl dimethyl di(meth)acrylate, and di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy(meth)acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

In one embodiment, the compositions comprise, relative to the total weight of the composition, at least 10 wt % of one or more reactive diluents, e.g. at least 20 wt % or at least 30 wt %. The compositions generally comprise less than 90 wt % of one or more reactive diluents, e.g. less than 75 wt % or less than 50 wt %.

Examples of free radical photo initiators include benzophenones (e.g. benzophenone, alkyl-substituted benzophenone, or alkoxy-substituted benzophenone); benzoins, e.g. benzoin, benzoin ethers, such as benzoin methyl ether, benzoin ethyl ether, and benzoin isopropyl ether, benzoin phenyl ether, and benzoin acetate; acetophenones, such as acetophenone, 2,2-dimethoxyacetophenone, 4-(phenylthio) acetophenone, and 1,1-dichloroacetophenone; benzil, benzil ketals, such as benzil dimethyl ketal, and benzil diethyl ketal; anthraquinones, such as 2-methylanthraquinone, 2-ethylanthraquinone, 2-tert-butylanthraquinone, 1-chloroanthraquinone, and 2-amylanthraquinone; triphenylphosphine; benzoylphosphine oxides, such as, for example, 2,4,6-trimethylbenzoyldiphenylphosphine oxide; thioxanthones and xanthones, acridine derivatives, phenazene derivatives, quinoxaline derivatives or 1-phenyl-1,2-propanedione-2-O-benzoyloxime, 1-aminophenyl ketones or 1-hydroxyphenyl ketones, such as 1-hydroxycyclohexyl phenyl ketone, phenyl(1-hydroxyisopropyl)ketone and 4-isopropylphenyl(1-hydroxyisopropyl)ketone, or triazine compounds, for example, 4'-methyl thiophenyl-1-di(trichloromethyl)-3,5-S-triazine, S-triazine-2-(stilbene)-4,6-bis(trichloromethyl), and paramethoxy styryl triazine. Free radical photoinitiators are particularly useful if the composition comprises ethylenically unsaturated components, for instance acrylates or methacrylates. In one embodiment, the compositions comprise, relative to the total weight of the composition, 0-10 wt % of one or more free radical photoinitiators, e.g. 0.5-7.5 wt %.

Examples of cationic photoinitiators include, for instance, onium salts with anions of weak nucleophilicity. Examples include halonium salts, iodosyl salts or sulfonium salts, such as are described in published European patent application EP 153904 and WO 98/28663, sulfoxonium salts, such as described, for example, in published European patent applications EP 35969, 44274, 54509, and 164314, or diazonium salts, such as described, for example, in U.S. Pat. Nos. 3,708,296 and 5,002,856.

Additional examples of additives include antioxidants, dyes, wetting agents, antifoaming agents, thickening agents, photosensitizers, solvents (preferably in amounts less than 20 wt %, e.g. less than 10 wt %, less than 5 wt %, or about 0 wt %), and metallic-, organic-, inorganic-, or organic/inorganic hybrid fillers (e.g. silica particles, glass beads, or talc). The size of the fillers may vary and can be, for instance, in the nanometer range or in the micrometer range. In one embodiment, the present compositions comprise, relative to the total weight of the composition, less than 20 wt % of fillers, e.g. less than 10 wt %, less than 5 wt %, or about 0 wt %.

Additional additives include colorants such as titanium dioxide and carbon black.

Methods of Making

In some embodiments, the TPUs are made by a process that comprises reacting under the following conditions:

(a) a polyester comprising at least one nitro-substituted polyester diol, and (b) at least one polyisocyanate, and condensing with (c) at least one chain extender.

In some embodiments, the reaction conditions comprise a temperature of 25 to 120° C.

In some embodiments, the polyester comprising at least one nitro-substituted polyester diol further comprises at least one polyester diol not comprising a nitro group.

In some embodiments, the TPU foams are made by a process comprising reacting under reaction conditions:

(a) a polyester comprising at least one nitro-substituted polyester-diol, (b) at least one polyisocyanate, (c) at least one chain extender, (d) at least one flame retardant, (e) at least one surfactant, (f) at least one foaming agent, and (g) at least one urethane catalyst.

Applications

The TPUs are useful in a wide variety of applications. In some embodiments, the compositions are useful for preparing molded articles such as soles for footwear, hard solid plastics such as for electronic instrument bezels and structural parts, flexible plastics such as straps and bands, and for seals, gaskets, durable elastomeric wheels and tires, automotive suspension bushings, and electrical insulating parts. In some embodiments, the compositions are useful for 3D printing when the compositions are extruded into filament. In some embodiments, the compositions can be pelletized and expanded to yield expanded TPU foams for footwear applications.

It should be understood that this invention is not limited to the particular methodologies, protocols, and reagents, etc., described herein and as such can vary therefrom. The terminology used herein is for the purpose of describing particular embodiments only, and is not intended to limit the scope of the present invention, which is defined solely by the claims.

EXAMPLES

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention.

To the extent that specific materials are mentioned, it is merely for purposes of illustration and is not intended to limit the invention. One skilled in the art may develop equivalent means or reactants without the exercise of inventive capacity and without departing from the scope of the invention.

General Materials and Methods

Dicarboxylic acids (DCAs) employed in polyester diol synthesis were obtained from the accelerated thermal oxidative decomposition (ATOD) of polyethylene plastic and consist of a mixture of linear aliphatic DCAs with carbon numbers ranging from 4-24 carbons. The mixture also contains DCAs bearing one or more nitro functional groups along the aliphatic linker. Average DCA molecular weights for the purposes of chemical synthesis were determined by titration with aqueous sodium hydroxide with phenolphthalein as indicator (acid number determination). Other reagents and equipment were obtained from commercial sources and used as received, unless otherwise indicated. The materials used in the examples are as follows:

The following methods and criteria are used in evaluation and determination of each TPU parameter.

Glass Transition Temperature:

The glass transition temperature ($T_g$) was measured via differential scanning calorimetry (DSC).

Shore A Hardness:

Shore A Hardness was measured according to DIN 533505 in which the hardness is off 3 seconds after the pressure foot comes in contact with the test specimen. The hardness is indicated as Shore A hardness in the following text.

Tensile Strength:

Tensile strength is measured via an Instron Universal Tester using ASTM Type 4 test bars.

Elongation:

Elongation is measured via an Instron Universal Tester using ASTM Type 4 test bars.

The materials used in the examples are as follows:
PED=Polyester diol (synthetic mixture of dicarboxylic acids and 1,6-hexanediol)
$NO_2$-PED=Nitro functionalized polyester diol (synthesized from ATOD DCA's)
Emerox 14801=Biobased polyester diol (commercially available)
MDI=4,4'-diphenylamine diisocyanate (commercially available)
HDI=hexamethylene diisocyanate (commercially available)
HD=1,6-hexane diol (commercially available)
MPD=2-methyl propane diol (commercially available)
1,4-BD=1,4-butane diol (commercially available)
DTBL=Dibutyltin dilaurate (commercially available)
Irganox 1076=Phenolic antioxidant (commercially available)
Irgafos 168=Phosphite antioxidant (commercially available)
Tinuvin 234=Benzotrizole UV absorber (commercially available)

Nitro-Polyester Diol Synthesis

Nitro-substituted polyester diols were synthesized according to the following general procedure and as represented in Scheme 1: dicarboxylic acid mixture was combined with diol (e.g. 1,6-hexanediol and a catalytic amount of concentrated sulfuric acid or other suitable catalyst; catalyst loading varied between 0.2 mole percent (mol %) to 4 mol %). The mixture was heated while stirring in a pre-warmed oil bath at 100-110° C. for 2-4 hours under atmospheric pressure, followed by application of reduced pressure (≤19 mbar) for 1-2 hours. The product was cooled under vacuum, and characterized by ATR-FTIR analysis and end group titration (total acid number and hydroxyl number). Titrations were performed using Test Method A according to ASTM D-4274-99 with slight modifications, and results were used to calculate approximate polyester diol molecular weight. Polyester diols stored outside of a desiccator for prolonged periods were dried prior to use by overnight incubation in a vacuum oven at 80° C., or by bubbling dry inert gas (e.g. argon) through the polyol at ≥100° C. while simultaneous applying vacuum for 1 hour, followed by storage in an ambient pressure desiccator. Specific and non-limiting examples of polyester diols synthesized containing recycled content are presented in Examples 1-4.

Example 1

Dicarboxylic acid (DCA) mixture obtained from ATOD of polyethylene waste having an average molecular weight of 178.14 g/mol (23.517 grams, 0.5869 molar equivalents) was combined with 1,6-hexanediol (26.581 grams, 1 molar equivalent) and sulfuric acid catalyst (0.131 grams, 1 mol % relative to DCA mix) at room temperature in a round bottom flask containing a Teflon-coated magnetic stir bar. The mixture was heated to 105° C. open to air for 4 hours with stirring, at which point heating and stirring of the reaction melt was continued under applied vacuum (≤19 mbar) for 2 more hours. The reaction mixture was cooled under vacuum and stored in a desiccator. The nitro-containing polyester diol product (PE-1) was characterized by attenuated total reflectance Fourier transform infrared spectroscopy (ATR-FTIR), 1H NMR, gel permeation chromatography (GPC) and end-group titration (total acid number, and hydroxyl number determination by the acetylation method, Test Method A according to ASTM D-4274-99). The acid number was measured as 4.6±0.3 mg KOH/g sample, the hydroxyl number was 183±9 mg KOH/g sample, the number average molecular weight was determined to be 614±30 g/mol by titration.

Example 2

ATOD DCA mixture (42.803 grams, 0.901 molar equivalents) was combined with 1,6-hexanediol (31.513 grams, 1 molar equivalent) and concentrated sulfuric acid (98%, 0.229 grams, 1 mol % relative to DCA mix) in a round bottom flask with a Teflon-coated magnetic stir bar. The mixture was heated at 105° C. open to air to produce a homogeneous melt for 4 hours, followed by application of vacuum (≤19 mbar) with continued heating for 2 additional hours. The product was cooled under vacuum and stored in an ambient pressure desiccator. The nitro-containing polyester diol product PE-2 was characterized by ATRFTIR, GPC, and end-group titration as in Example 1. The acid number was 6.3±0.6 mg KOH/g, the hydroxyl number was 37.4±8.1 mg KOH/g, the number average molecular weight was 2615 g/mol by titration.

Further non-limiting examples of nitro-substituted polyester diols ($NO_2$-PE) prepared by the methods described above are shown in Table 1.

TABLE 1

| Sample | Acid Number (mg KOH/g) | Hydroxyl Number (mg KOH/g) | Molecular Weight (g/mol) | Molar Equivalents 1,6-Hexanediol | Molar Equivalents of DCA | $H_2SO_4$ (mol %)* |
|---|---|---|---|---|---|---|
| PED-1 | 4.6 ± 0.3 | 183 + 9 | 614 | 1 | 0.587 | 1 |
| PED-2 | 6.3 ± 0.6 | 37.4 ± 8.1 | 2615 | 1 | 0.901 | 1 |
| PED-3 | 7.9 ± 0.8 | 144 ± 21 | 740 | 1 | 0.777 | 1.4 |
| PED-4 | 10.8 ± 1.6 | 62.6 ± 9.6 | 1528 | 1 | 0.924 | 0.7 |
| PED-5 | 8.5 ± 0.3 | 91.6 ± 0.6 | 1121 | 1 | 0.924 | 3.9 |
| PED-6 | 12 | 177 | 593 | 1 | 0.575 | 1 |
| PED-7 | — | 196 ± 2 | 572 | 1 | 0.599 | 4 |

*Relative to DCA's

Nitro-substituted polyester diols may optionally be synthesized from the corresponding dimethyl esters of DCAs obtained from ATOD of polyethylene plastic waste, as depicted in Scheme 2 and described in Examples 3 and 4.

Example 3 (Ref: RP1-139A)

The starting diester mix is estimated to have an average molecular weight of 177 g/mol. A reactor is charged with 100 parts by mass of the diester mix and 107 parts by mass of 1,6-hexanediol and heated to 120° C. To this mixture are added 6 parts of a 10 wt % solution of dibutyl tin(IV) dilaurate in heptane. The solution is stirred and allowed to react at 120° C. for 17 hours, allowing heptane and evolved methanol to evaporate out of the reactor. The reaction is then cooled to give 146 parts by weight isolated of the product as a clear yellow liquid. GPC analysis in THF vs polystyrene standards indicate Mn 600, PDI 3.49.

Example 4 (Ref: RP1-139D)

The starting diester mix is estimated to have an average molecular weight of 177 g/mol. A reactor is charged with 100 parts by mass of the diester mix and 72 parts by mass of 1,6-hexanediol and heated to 120° C. To this mixture are added 5.5 parts of a 10 wt % solution of dibutyl tin(IV) dilaurate in heptane. The solution is stirred and allowed to react at 120° C. for 17 hours, allowing heptane and evolved methanol to evaporate out of the reactor. The reaction is then cooled to give 119 parts by weight isolated of the product as a clear yellow liquid. GPC analysis in THF vs polystyrene standards indicate Mn 3200, PDI 2.13.

Example 5—(Ref. KK1-153B)

The parts and percentages referred to in the examples are by weight (pbw) or percentages by height. All samples are prepared identically. The diisocyanate, 4,4'-MDI, is dried and directly fed into a reaction vessel in excess. The PED (compositions shown in Table 2) is added to the excess diisocyanate and allowed to react fully at temperatures up to 60° C. to yield a TPU prepolymer. A DTBL catalyst and 2-methyl propane diol (MPD) chain extender are added to the prepolymer while stirring rapidly and allowed to fully react at temperatures up to 100° C. The chain extended TPU is poured into a mold heated to temperatures up to 125° C. The mold is placed in an oven at 100° C. for 24 hours or until the TPU is fully cured. The cast elastomers are compression molded into test specimens. The post-cured TPU's are characterized using FTIR, DSC, TGA, Instron Mechanical Testing and a Shore Hardness A Durometer.

TABLE 2

| Sample | Acid Number (mg KOH/g) | Hydroxyl Number (mg KOH/g) | Molecular Weight (g/mol) | 1,6-hexanediol (molar equivalents) | DCA Mixture (molar equivalents) | $H_2SO_4$ (mol %)* |
|---|---|---|---|---|---|---|
| PED (Comparative Sample A) | 3.33 | 93.0 | 1206 | 1 | 0.738 | 1.0 |
| $NO_2$-PED (Example 5) | 8.48 | 92.8 | 1210 | 1 | 0.767 | 1.0 |

*Relative to DCA's

TABLE 3

| Property | Example 5 | Comparative Sample A |
|---|---|---|
| $NO_2$-PED (wt. %) | 64.0 | — |
| PED (wt. %) | — | 64.0 |
| MDI (wt. %) | 31.0 | 31.0 |
| MPD (wt. %) | 5.0 | 5.0 |
| % Recycled Content (Nitro Component) | 36.3 | — |
| $C=O_{H-Bond}/C=O_{Free}$ (FTIR) | 0.92 | 0.92 |
| $T_g$ (° C.) | 0.02 | −9.29 |
| $T_d$ (° C.) | 364 | 389 |
| Shore Hardness A | 70.0 | 60 |
| Tensile Strength (MPa) | 9.6 | 1.6 |
| Elongation (%) | 367.0 | 730.0 |

TPU elastomer Example 5 and Comparative Sample A are prepared from the formulations described in Table 2. The results in Table 3 show that the presence of nitro groups on the PED backbone results in a TPU with a higher glass transition temperature, higher Shore A Hardness, higher tensile strength, and lower elongation when compared to Sample A.

Example 6—(Ref. KK2-53)

Example 6 and Comparative Sample B are prepared using the PEDs described in Table 4. For Example 6, 1,4-BD and a $NO_2$-PED having a number average molar weight of $1.0 \times 10^3$ g/mol derived from the DCA mixture obtained from ATOD are dried and charged into a reaction vessel. Furthermore, 2 wt. % of Sicopal Blue K pigment, 0.3 wt. % of Irganox 1076, and 0.15 wt. % of Irgafos 168 are added to the 1,4-BD/$NO_2$-PED mixture. HDI is slowly added while stirring vigorously. The reaction proceeds at 80° C. for 2.5 hours. The reaction mixture is poured into a pre-heated silicone mold and cured at 100° C. for 24 hours. The cast elastomer is then compression molded into test specimens. Comparative Sample B is prepared following the same methodology using a nitro-free polyester diol, Emerox 14801, having a number average molar weight of $1.1 \times 10^3$ g/mol. The results in Table 5 show the nitro-functionalized TPU derived from a $NO_2$-PED yields a higher Shore A hardness, higher tensile strength, and higher elongation compared to nitro-free PED.

Example 7—(Ref. KK2-082)

1,4-BD and a $NO_2$-PED having a number average molar weight of $1.8 \times 10^3$ g/mol derived from the transesterified $NO_2$-diester mixture are dried and charged into a reaction vessel. HDI is slowly added while stirring vigorously. The reaction proceeds at 80° C. for 2.5 hours. The reaction mixture is poured into a pre-heated silicone mold and cured at 100° C. for 24 hours. The cast elastomer is then compression molded into test specimens.

TABLE 4

| Sample | Acid Number (mg KOH/g) | Hydroxyl Number (mg KOH/g) | Molecular Weight (g/mol) | 1,6-hexanediol (molar equivalents) | $NO_2$-DCA Mixture (molar equivalents) | $H_2SO_4$ (mol % relative to DCA) |
|---|---|---|---|---|---|---|
| Emerox 14801 (Sample B) | 0.60 | 95.0 | 1200 | — | — | — |
| $NO_2$-PED (Example 6) | 18.0 | 109 | 1210 | 1 | 0.767 | 1.0 |
| $NO_2$-PED (Example 7) | 2.00 | 63.0 | 1781 | 1 | 0.842* | — |

*Diester form

TABLE 5

| Property | Example 6 | Example 7 | Sample B |
|---|---|---|---|
| $NO_2$-PED (wt. %) | 73.1 | 71.8 | — |
| PED (wt. %) | — | — | 75.3 |
| HDI (wt. %) | 21.0 | 22.1 | 20.1 |
| 1,4-BD (wt. %) | 5.8 | 6.1 | 4.6 |
| % Recycled Content | 34.5 | 33.0 | — |
| $T_g$ (° C.) | −39.0 | −42 | −38.0 |
| Shore Hardness A | 85 | 80 | 70 |
| Tensile Strength (MPa) | 12.6 | 20.7 | 3.3 |
| Elongation (%) | 404.0 | 541.6 | 202.0 |

Example 8—(Ref. KK2-017)

HDI is dried and fed into a reaction vessel in excess. Separately, the $NO_2$-PED with a number average molecular weight of $1.3 \times 10^3$ g/mol is blended with 2.0 wt. % carbon black. The formulated $NO_2$-PED is then added to the excess diisocyanate and allowed to react fully at temperatures up to 60° C. to yield a TPU prepolymer. A DTBL catalyst and MPD are added to the prepolymer while stirring rapidly and allowed to fully react at temperatures up to 100° C. The chain extended TPU is poured into a preheated silicone mold. The mold is placed in an oven at 100° C. for 24 hours or until the TPU is fully cured. The cast elastomers are compression molded into test specimens.

Example 9—(Ref. KK2-29)

4,4'-MDI is dried and fed into a reaction vessel in excess. Separately, the $NO_2$-PED with a number average molecular weight of $1.3 \times 10^3$ g/mol is blended with 0.5 wt. % Tinuvin 234, 0.17 wt. % Irgafos 168, and 0.33 wt. % Irganox 1076. The formulated $NO_2$-PED is then added to the excess diisocyanate and allowed to react fully at temperatures up to 60° C. to yield a TPU prepolymer. A DTBL catalyst and 1,4-BD are added to the prepolymer while stirring rapidly and allowed to fully react at temperatures up to 100° C. The chain extended TPU is poured into a preheated silicone mold. The mold is placed in an oven at 100° C. for 24 hours or until the TPU is fully cured. The cast elastomers are compression molded into test specimens.

Example 10—(Ref. KK1-97)

A $NO_2$-PED having a number average molecular weight of 500 g/mol was blended with 3.0 wt. % distilled water, 2 wt. % silicone oil, and 1.0 wt. % DTBL catalyst in a flat-bottom polyethylene beaker and mixed. MDI is added directly to the formulated polyol and mixed vigorously for 15 s. The resulting foam was allowed to stabilize at room temperature for 24 hours prior to characterization.

TABLE 6

| Property | Example 8 | Example 9 | Example 10 |
|---|---|---|---|
| $NO_2$-PED (wt. %) | 74.9 | 67.1 | 70.0 |
| MDI (wt. %) | — | 27.8 | 30.0 |
| HDI (wt. %) | 19.3 | — | — |
| 1,4-BD (wt. %) | — | 5.1 | — |
| MPD (wt. %) | 5.7 | — | — |
| % Recycled Content | 34.8 | 34.5 | 37.1 |
| $T_g$ (° C.) | −46.4 | −12.5 | −0.50 |
| Shore Hardness A | 85 | 60 | —* |

*Foam

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Various embodiments of this application are described herein, including the best mode known to the inventors for carrying out the application. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A thermoplastic polyurethane elastomer composition comprising the reaction product of
   (a) a composition comprising at least one nitro-substituted polyester diol ($NO_2$-PED), and at least one polyester diol that is not substituted by a nitro group, wherein the $NO_2$-PED has the formula:

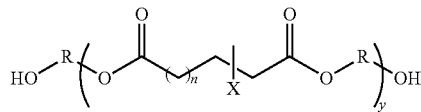

wherein n is 0-14, y is 1-100, X=H or $NO_2$, and R is alkylenyl, alkylenyl with one or more $CH_2$ groups substituted by —O—, cycloalkylenyl, or arylenenyl, wherein at least one X is $NO_2$,
   (b) at least one polyisocyanate, and
   (c) at least one chain extender.

2. The composition of claim 1, wherein R is alkylenyl.

3. The composition of claim 2, wherein R is ethylenyl, propylenyl, isopropylenyl, butylenyl, pentylenyl, hexylenyl, heptylenyl, or octylenyl.

4. The composition of claim 1, wherein R is alkylenyl, wherein one or more $CH_2$ groups are substituted by —O—.

5. The composition of claim 1, wherein R is —$(CH_2)_o$—O—$(CH_2)_o$—, $CH_3$—O—$(CH_2)_o$—O—$(CH_2)_o$—$CH_3$, $(CH_3CH(OH)CH_2)_2O$, wherein o is 2-4.

6. The composition of claim 1, wherein R is arylenenyl.

7. The composition of claim 1, in which the $NO_2$-PED before reaction has a number average molecular weight of 400-10,000 g/mol.

8. The composition of claim 1, wherein the chain extender is a dihydroxyalkane or dihydroxycycloalkane.

9. The composition of claim 8, wherein the chain extender is ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neo-pentyl glycol, 1,4-cyclohexanedimethanol, 1,4-dihydroxycyclohexane, or mixtures thereof.

10. The composition of claim 1, wherein the chain extender is an alkylene or aralkylene diamine.

11. The composition of claim 10, wherein the chain extender is ethylene diamine, hexamethylene diamine, 1,4-cyclohexanylene diamine, or mixtures thereof.

12. The composition of claim 1, wherein the chain extender is an aromatic diamine.

13. The composition of claim 12, wherein the aromatic diamine is benzidine, dihydroxymethoxy hydroquinone, toluene diamine, diaminodiphenyl methane, phenylene diamine, or mixtures thereof.

14. The composition of claim 1, wherein the chain extender is hydrazine.

15. The composition of claim 1, wherein the chain extender is an amino alcohol.

16. The composition of claim 15, wherein the chain extender is ethanolamine, N-methylethanolamine, N-butylethanolamine, N-oleoylethanolamine, N-cyclohexylisopropanolamine, or mixtures thereof.

17. The composition of claim 1, wherein the chain extender is a substituted aromatic diamine.

18. The composition of claim 17, wherein the chain extender is 4,4'-methylene-bis(o-chloroaniline), 4,4'-methylenebis(3-chloro-2,6-diethylaniline), or mixtures thereof.

19. The composition of claim 1, wherein the thermoplastic polyurethane elastomer composition further comprises at least one crosslinking agent.

20. The composition of claim 19, wherein the at least one crosslinking agent is glycerine, trimethylolpropane, diethanolamine, triethanolamine, or mixtures thereof.

21. The composition of claim 1, wherein a ratio of polyisocyanate to active hydrogen containing group (the NCO index) is from 0.9-1.5.

22. The composition of claim 1, wherein the at least one polyisocyanate is 4,4'-diisocyanatodiphenylmethane (4,4'-MDI), 2,4'-diisocyanato diphenylmethane (2,4'-MDI), p-phenylene diisocyanate, 1,3-bis(isocyanatomethyl)cyclohexane, 1,4-diisocyanato cyclohexane, hexamethylene diisocyanate, isophorone diisocyanate, 1,5-naphthalene diisocyanate, 3,3'-dimethyl-4,4'-biphenyl diisocyanate, 4,4'-diisocyanato-dicyclohexylmethane, 2,6-toluene diisocyanate, 2,4-toluene diisocyanate, or mixtures thereof.

23. The composition of claim 1, further comprising at least one additive comprising:
    (a) a light stabilizer or a UV stabilizer;
    (b) an inorganic filler or an organic filler;
    (c) a silicate mineral, metal oxide, metal salt, clay, metal silicate, glass fiber, natural fibrous material, or a synthetic fibrous mineral;
    (d) carbon black, fullerene, carbon nanotubes, biochar, melamine colophony, cellulose fibers, polyamide fibers, polyacrylonitrile fibers, polyurethane fibers, polyester fibers based on aromatic and/or aliphatic dicarboxylic acid esters, or carbon fibers; and
    (e) an organic phosphate, metal polyphosphate, metal oxide, metal salt, or a cyanuric acid derivative;
wherein the additives are present in 0.5-30 percent by weight of the composition.

24. The composition of claim 1, further comprising at least one flame retardant that is an organic phosphate, metal polyphosphate, metal oxide, metal salt, cyanuric acid derivative, or mixtures thereof; wherein the at least one flame retardant is present in 500 to 4000 ppm of the composition.

25. The composition of claim 1, further comprising a foaming agent that is water, pentane, cyclopentane, or a hydrofluorocarbon, or mixtures thereof.

26. The composition of claim 1, wherein the at least one nitro-substituted polyester diol comprises at least one C8-C20 dicarboxylic acid substituted with a single nitro group, and at least one polyol.

27. The composition of claim 26, wherein the at least one polyol is a $C_{1-8}$ diol.

28. The composition of claim 1, which comprises 20-80% by weight of the nitro-substituted polyester diol.

* * * * *